United States Patent
Yamaguchi

(10) Patent No.: US 7,382,486 B2
(45) Date of Patent: Jun. 3, 2008

(54) PRINTING SYSTEM

(75) Inventor: Katsuya Yamaguchi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 973 days.

(21) Appl. No.: 10/615,377

(22) Filed: Jul. 9, 2003

(65) Prior Publication Data

US 2004/0036916 A1  Feb. 26, 2004

(30) Foreign Application Priority Data

Aug. 21, 2002  (JP) ............ P2002-240772

(51) Int. Cl.
  *G06F 15/00* (2006.01)
  *G06K 1/00* (2006.01)
  *G06K 15/00* (2006.01)

(52) U.S. Cl. ............ 358/1.18; 358/1.15; 358/1.16; 358/1.9; 400/61; 400/63

(58) Field of Classification Search ............ 358/1.15, 358/1.16, 1.18, 1.9; 400/61, 63
See application file for complete search history.

(56) References Cited

U.S. PATENT DOCUMENTS 5,047,955 A  9/1991  Shope et al.
5,718,520 A * 2/1998  MacKay ............ 400/61
6,031,625 A  2/2000  Sherman et al.

FOREIGN PATENT DOCUMENTS

JP  8-29958  2/1996
JP  2002-292942 A  10/2002

OTHER PUBLICATIONS

Dr. Gerd Goldmann, "Das Druckerbuch", Oce Printing Systems GmbH Ausgabe 4c, Okt. 1999, ISBN: 3-00-001919-X, S. 11-1 bis 11-12.

* cited by examiner

*Primary Examiner*—Twyler Lamb Haskins
*Assistant Examiner*—Yixing Qin
(74) *Attorney, Agent, or Firm*—McDermott Will & Emery LLP

(57) ABSTRACT

Provided is a printing system capable of printing, when one or more pages are replaced after raster image processing (RIP), by performing RIP of only the page(s) to be replaced. A job ticket is issued from a printing apparatus. In a printing data creating apparatus, information of page data for replacement is added to the content of the job ticket and then sent to the printing apparatus together with the page data for replacement. In the printing apparatus, only the received page data for replacement is subjected to RIP, and then printing after replacement processing is executed in accordance with the job ticket. It is unnecessary to perform again RIP of printing data irrelevant to the replacement. This increases the efficiency of processing and also lowers the cost.

6 Claims, 7 Drawing Sheets

| R1 | JOB NAME | JOB1 |
| R2 | TOTAL PAGE | 20 |
| R3 | SHEET DIRECTION | PORTRAIT ORIENTATION |
| R4 | SHEET SIZE | A4 |
| R5 | IMMEDIATE PRINTING | YES |
| R6 | NUMBER OF PRINTED MATTER | 10 |
| R7 | FEEDING TRAY | 2 |

| R11 | JOB NAME | JOB1 |
| R12 | TOTAL PAGE | 20 |
| R13 | SHEET DIRECTION | PORTRAIT ORIENTATION |
| R14 | SHEET SIZE | A4 |
| R15 | IMMEDIATE PRINTING | YES |
| R16 | NUMBER OF PRINTED MATTER | 10 |
| R17 | FEEDING TRAY | 2 |
| R18 | PAGE REPLACEMENT | 20 |
| R19 | REPLACEMENT FILE | newname.pdf |
| R20 | LATEST EDITORIAL APPLICATION | DIFFERENTIAL EDITION plug-in |
| R21 | LATEST EDITORIAL DATE | 2002.08.12 8:40 |

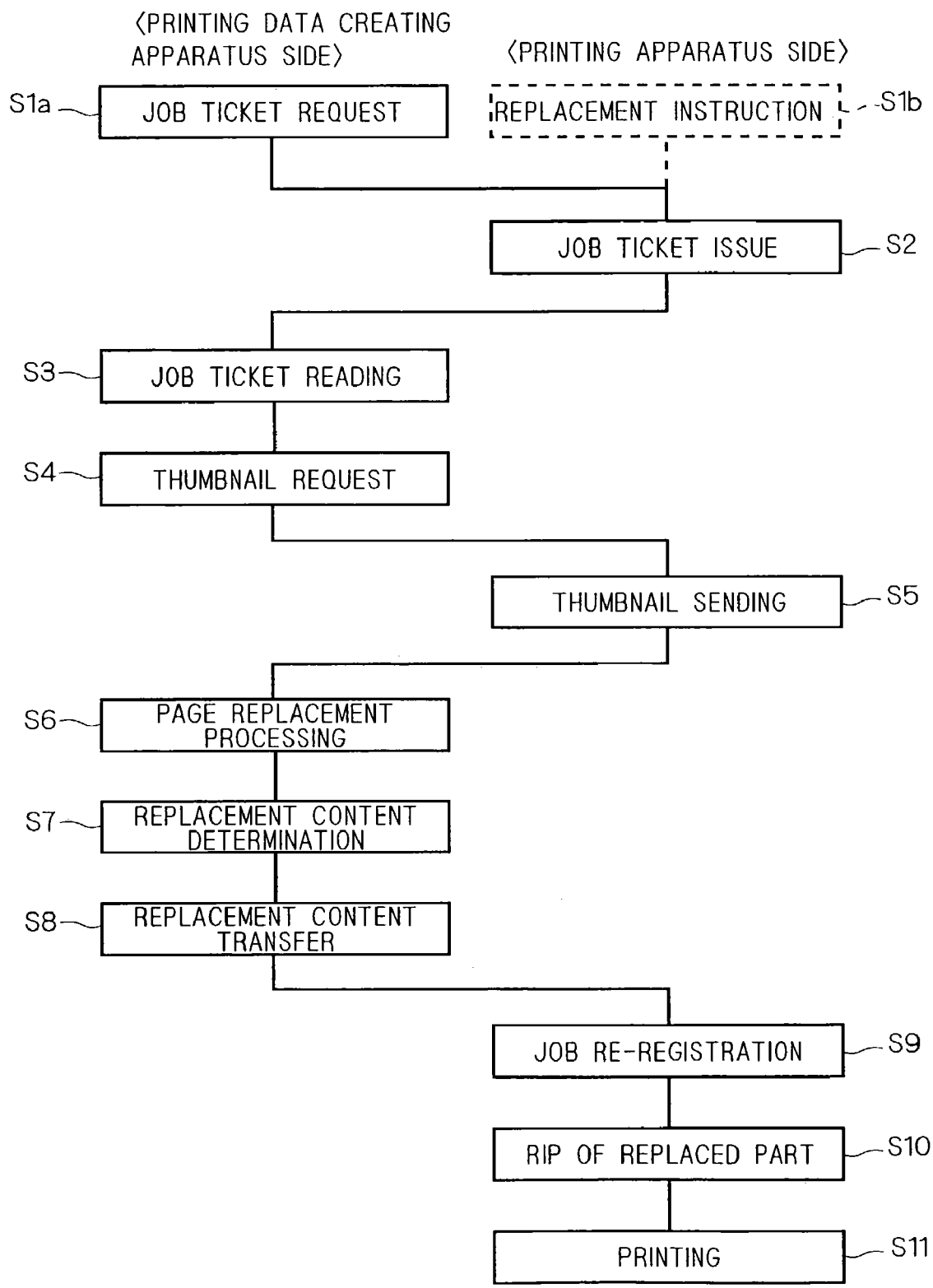

FIG. 7A

XYZ Co., Ltd.
Head Office: Osaka-shi, 1-2-3
A Factory: Osaka-shi, 4-5-6

XYZ Incorporation
Head Office: Osaka-shi, 1-2-3
A Factory: Osaka-shi, 4-5-6
B Factory: Kyoto-shi, 7-8-9

(as of Aug. 1, 2002)

P2

PRINTING SYSTEM

BACKGROUND OF THE INVENTION

1. Field of the Invention

The present invention relates to a technique of improving the efficiency of the procedure of replacing one or more pages when obtaining a printed matter consisting of a plurality of pages.

2. Description of the Background Art

By virtue of the development of DTP (desk top publishing) technique, digital data described in page description language such as PDF (portable document format) is generally used as a draft manuscript for obtaining a printed matter consisting of a number of pages. Whereas on the side of printing apparatus, so-called digital printing apparatus such as a printer employing electrophotographic process is widely applied, which enables to directly executing printing after a draft digital data is subjected to raster image processing (RIP). Since such a digital printing apparatus does not use any press plate unlike conventional practice, it can provide a multiple-page and small-lot printed matter at a relatively low cost and therefore suitable for the use of on-demand printing.

Printed matter consisting of a plurality of pages often requires a partial revision for the reason, for example, that although there is no need for changing its overall construction and main descriptions, some descriptions disagree with the fact after an elapse of time since the first issue date. For example, in printed matters such as merchandise catalogs issued continuously by a business enterprise and a variety of manuals, the use of which are limited, are usually made by on-demand printing, if the enterprise name is changed or its new factory and the like are established, it is desirable that the name and address of the business enterprise etc. are replaced with the latest content as soon as possible from the standpoint of public confidence, although such a change is irrelevant to the essential contents of the printed matters.

When digital data is used for draft manuscript and a digital printing apparatus executes its printing, data already subjected to RIP and used for printing is usually preserved in reusable condition. Therefore, in the above stated case, all the pages except for one ore more pages to be replaced must be directly used again for printing. It has been however necessary that since the entire draft data configures a single data, even if only one page requires a partial replacement, all the pages including pages irrelevant to the replacement should be subjected again to RIP. This is wasteful and one factor in high cost, for example, from the standpoint of the efficiency of procedure.

SUMMARY OF THE INVENTION

The present invention relates to a technique of improving the efficiency of processing when a printed matter consisting of a plurality of pages is obtained in a printing system.

According to the present invention, a printing system includes (a) a printing apparatus for printing a printed matter on the basis of rasterize-processed printing data, and (b) a printing data creating apparatus for creating printing data. The printing apparatus includes (a-1) a raster image processing element for performing raster image processing of printing data; (a-2) a storage element for storing the rasterize-processed printing data; and (a-3) a job ticket issue element for issuing a first job ticket in which setting information for printing a first printed matter is described on the basis of first printing data stored in the storage element. The printing data creating apparatus includes (b-1) a layout creating element for creating the layout of a printed matter page by page; (b-2) a page arrangement processing element for performing page arrangement processing of a plurality of layout pages, the page arrangement processing element being capable of performing page rearrangement processing on the basis of first printing data rasterize-processed, by referring to the description of the first job ticket; (b-3) a job ticket obtaining element for obtaining the first job ticket; and (b-4) a job ticket update element for creating a second job ticket describing setting information for printing a second printed matter, by rewriting the content of the first job ticket on the basis of the result of the page rearrangement processing. The printing apparatus executes printing of the second printing matter by referring to the second job ticket.

With this configuration, when a new printed matter is obtained by performing rearrangement processing of a printed matter page by page, such as replacement, insertion, deletion and interchange, the printing data creating apparatus describes the content to be changed in a second job ticket, and the printing apparatus performs printing by referring to the description of the second job ticket and also using first printing data prior to the rearrangement processing. This configuration eliminates the necessity for recreating all the printing data.

Preferably, the page arrangement processing element includes: (b-2-1) a page replacement processing element for performing replacement processing for replacing page data of at least one page of the first printed matter with page data for replacement, as the page arrangement processing and the page rearrangement processing. The job ticket update element creates the second job ticket by adding information related to the replacement processing to the first job ticket, on the basis of the result of the replacement processing. The printing apparatus obtains the second job ticket and the page data for replacement, and then prints the second printed matter on the basis of the printing data and the page data for replacement, in accordance with the description of the second job ticket.

With this configuration, the printing data creating apparatus describes the content of replacement processing in a second job ticket, and the printing apparatus performs printing by referring to the description of the second job ticket and also using first printing data prior to the replacement processing. This configuration eliminates the necessity for recreating all the printing data and thus permits efficient page replacement processing of printed matter.

Accordingly, it is an object of the present invention to provide a printing system capable of printing, when a printed matter consisting of a plurality of pages is printed on the completion of rearrangement such as replacement, by performing raster image processing of only one ore more pages to be changed.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are diagrams showing illustratively job tickets;

FIG. 5 is a diagram showing the flow of job data replacement processing;

FIGS. 7A and 7B are diagrams showing in enlarged view the printing contents before and after page replacement processing.

DESCRIPTION OF THE PREFERRED EMBODIMENTS

System Configuration

Figure 1:
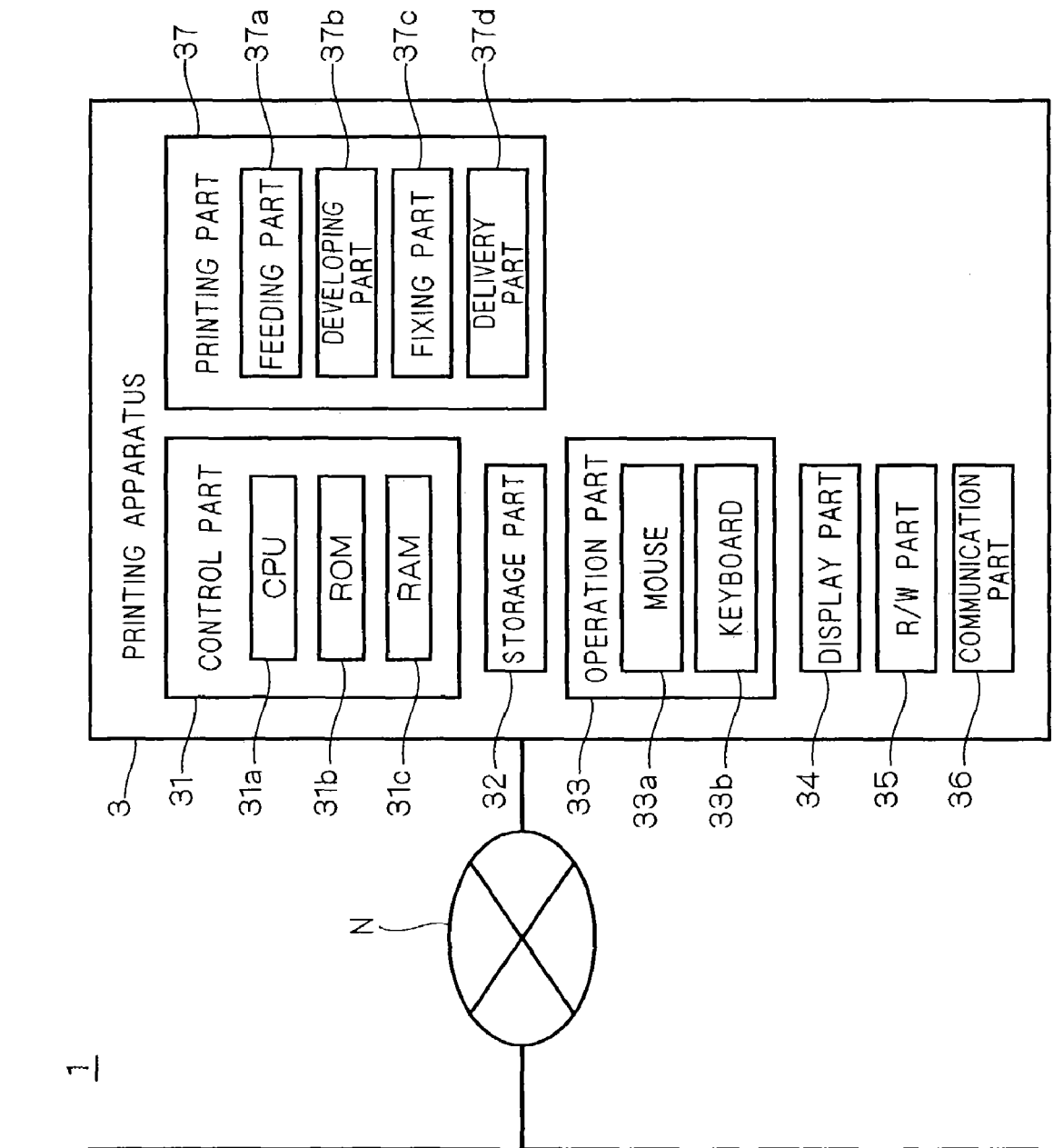
FIG. 1 is a diagram showing a schematic configuration of a printing system according to one preferred embodiment of the present invention.

FIG. 1 is a diagram showing a schematic configuration of a printing system 1 according to one preferred embodiment of the present invention. The printing system 1 comprises a printing data creating apparatus 2 and a printing apparatus 3. The printing data creating apparatus 2 can create a printing data by laying out a printed matter page by page with the use of document data, photographic data, line art data, etc., and then determining the arrangements of respective pages so laid out. The printing apparatus 3 performs raster image processing (RIP) of the printed data so created and then prints it on a predetermined printing sheet.

The printing data creating apparatus 2 is implemented by a general purpose personal computer. Specifically, the apparatus 2 comprises mainly (i) a control part 21 that is composed of a CPU 21a, ROM 21b and RAM 21c, and implements various functions to be described hereinafter; (ii) a storage part 22 that is composed of a hard disk etc. and preserves photographic data received from a digital camera and the like; (iii) an operation part 23 composed of a mouse 23a and keyboard 23b and the like, through which an operator inputs various instructions; (iv) a display part 24 such as a display; (v) a R/W part 25 for reading/writing data from/to a variety of portable recording media; and (vi) a communication part 26 that is an interface for giving and receiving data from/to other apparatus and the like.

Like the printing data creating apparatus 2, the printing apparatus 3 comprises (i) a control part 31 that is composed of a CPU 31a, ROM 31b and RAM 31c and implements various functions to be described hereinafter; (ii) a storage part 32; (iii) an operation part 33 composed of a mouse 33a and keyboard 33b and the like; (iv) a display part 34; (v) a R/W part 35; and (vi) a communication part 36, all the functions of which are implemented by a computer. The printing apparatus 3 further comprises a printing part 37 that performs printing on a predetermined printing sheet. The printing part 37 comprises a feeding part 37a for feeding printing sheets; a developing part 37b that makes to adhere toner to a printing sheet so as to correspond to a printing layout; a fixing part 37c that melts the toner by heating and pressing in order to form an image; and a delivery part 37d for stocking the printed sheets on which a printing image is formed. In an alternative, the printing apparatus 3 may have a plurality of feeding parts 37a for supplying multiple-type sheets having different sizes. In other alternative, there may be disposed two developing parts 37b and two fixing parts 37c so as to print two sides of a printing sheet. In still other alternative, there may be disposed a plurality of delivery parts 37d such that the delivery destination is changed depending on the type of the printing sheet.

The printing data creating apparatus 2 and printing apparatus 3 are connected to each other via the communication parts 26 and 36 to a network N such as LAN (local area network), through which data are given and received between the apparatuses 2 and 3. In an alternative, such data giving and receiving may be executed in the R/W parts 25 and 35 through a readable/writable portable recording medium.

Figure 2:
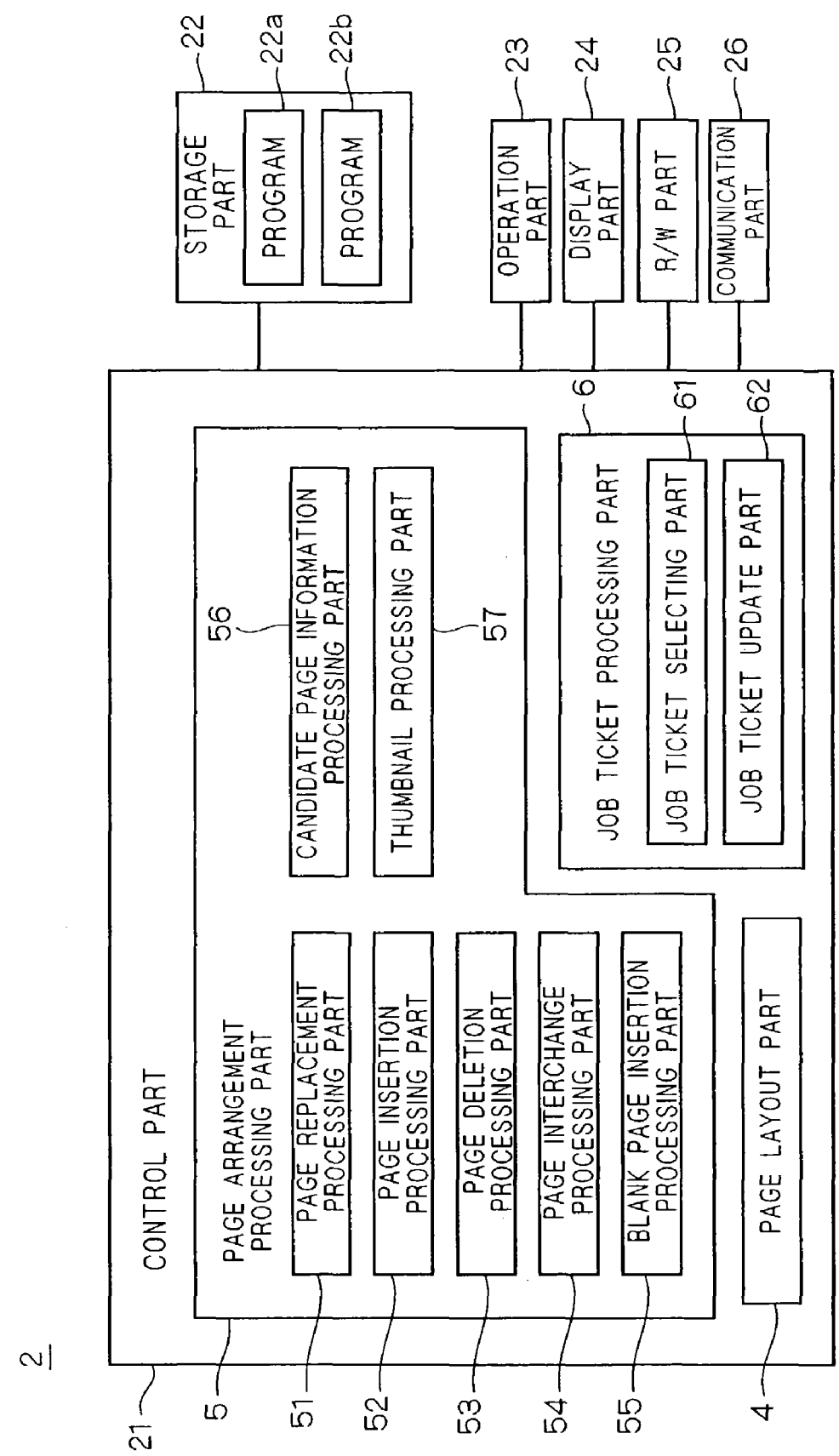
FIG. 2 is a diagram to explain the functions implemented by a control part of a printing data creating apparatus.

FIG. 2 is a diagram to explain the functions to be implemented by the control part 21 of the printing data creating apparatus 2. In the control part 21, predetermined programs 22a and 22b stored in the storage part 22 are executed so that a page layout part 4, page arrangement processing part 5 and job ticket processing part 6 are implemented by the functions of the CPU 21a, ROM 21b and RAM 21c. Hereat, the main functions of the page layout part 4 and page arrangement processing part 5 are to be implemented by the program 22a that is so-called layout software. Some functions, including the job ticket processing part 6, are to be implemented by the program 22b. The program 22b is to be executed as a plug-in program relative to the program 22a.

In the printing data creating apparatus 2, the control parts 21, operation part 23 and display part 24 function to implement so-called GUI (graphical user interface) which allows an operator to lay out a printed matter by displaying an editing printing data with the use of thumbnail image etc. on the display part 24 and also providing an instruction by a predetermined operation such as drag and drop of the thumbnail image with the use of the mouse 23a. The processing of each part implemented by the control part 21 is also executed with the use of the GUI.

The page layout part 4 is provided to perform layout processing of object data corresponding to individual components constituting a printed matter (e.g., character, photograph and line art), while displaying the editorial state of the printed matter page by page on the display part 24. Examples of this processing are the arrangement of a character manuscript, setting of font and paragraph, magnification/reduction and color correction of a photographic manuscript, and line art drawing. A printed matter can be laid out by locating a variety of objects stored in the storage part 22 at a desired position by drag and drop with the use of the mouse 23a or directly creating or inputting data with the use of the mouse 23a or keyboard 23b.

It is noted that a printed data does not always contain in its description itself the content of an object. In some cases, a printing data is described as a combination of (i) a layout information such as the arrangement position (coordinate), size (width and height), and attitude (angle) of each object subjected to a layout on a page under layout processing, (ii) an association information that associates the file name and storage location of each object data with the printing data, and (iii) a page arrangement information related to the arrangement of each page. In this case, a set of the printing data as such and the object data subjected to the layout is transferred to the printing apparatus 3, as data necessary for printing (printing data). In the present description of the invention, including the above-mentioned case, a set of printing data that is transferred from the printing data creating apparatus 2 to the printing apparatus 3 in order to execute printing is referred to as a "job data," and a printing processing executed for a single job data is referred to as a "job."

The page arrangement processing part 5 is provided to perform, with respect to the job data of a printed matter consisting of a plurality of pages, a variety of page arrangement processing related to page arrangement in a printed matter such as replacement, insertion, deletion and interchange of pages. In the page arrangement processing part 5, a similar processing is executable not only to a job data newly created but also a job data that has been transferred to the printing apparatus 3 and subjected to RIP. In this case, the page arrangement processing part 5 performs replacement, insertion, deletion or interchange of some pages of a printed matter obtained by an already completed job data, in other words, it performs rearrangement processing of the pages. In order to execute these processings, the page arrangement processing part 5 has a page replacement processing part 51, page insertion processing part 52, page deletion processing part 53, page interchange processing part 54 and blank page insertion processing part 55.

The page replacement processing part 51 performs replacement processing of replacing an arbitrary page of a printed matter with a page of updated content. The page insertion processing part 52 performs insertion processing of inserting a page of updated content between arbitrary pages of a printed matter. The page deletion processing part 53 performs deletion processing of deleting one or more pages of a printed matter. The page interchange processing part 54 performs interchange processing of interchanging any two pages of a printed matter. The blank page insertion processing part 55 performs blank page insertion processing of inserting between arbitrary pages of a printed matter one or more blank pages not to be subjected to printing.

In order to execute these processings, the page arrangement processing part 5 has a candidate page information processing part 56 and thumbnail processing part 57.

The candidate page information processing part 56 performs processing of selecting and holding information related to a page data, the information coming up for a candidate of a replacement or insertion when the page replacement processing part 51 performs page replacement or the page insertion processing part 52 performs page insertion. Hereat, page data is data covering one or more pages. The data format of a page data serving as a candidate of a replacement may not always agree with the data format of a job data.

In order that a variety of processings in the page arrangement processing part 5 are implemented by GUI, the thumbnail processing part 57 performs the necessary processing to provide thumbnail display of respective pages in a job data to be edited and respective pages in a page data to be subjected to page replacement processing or page insertion processing.

Figure 6:
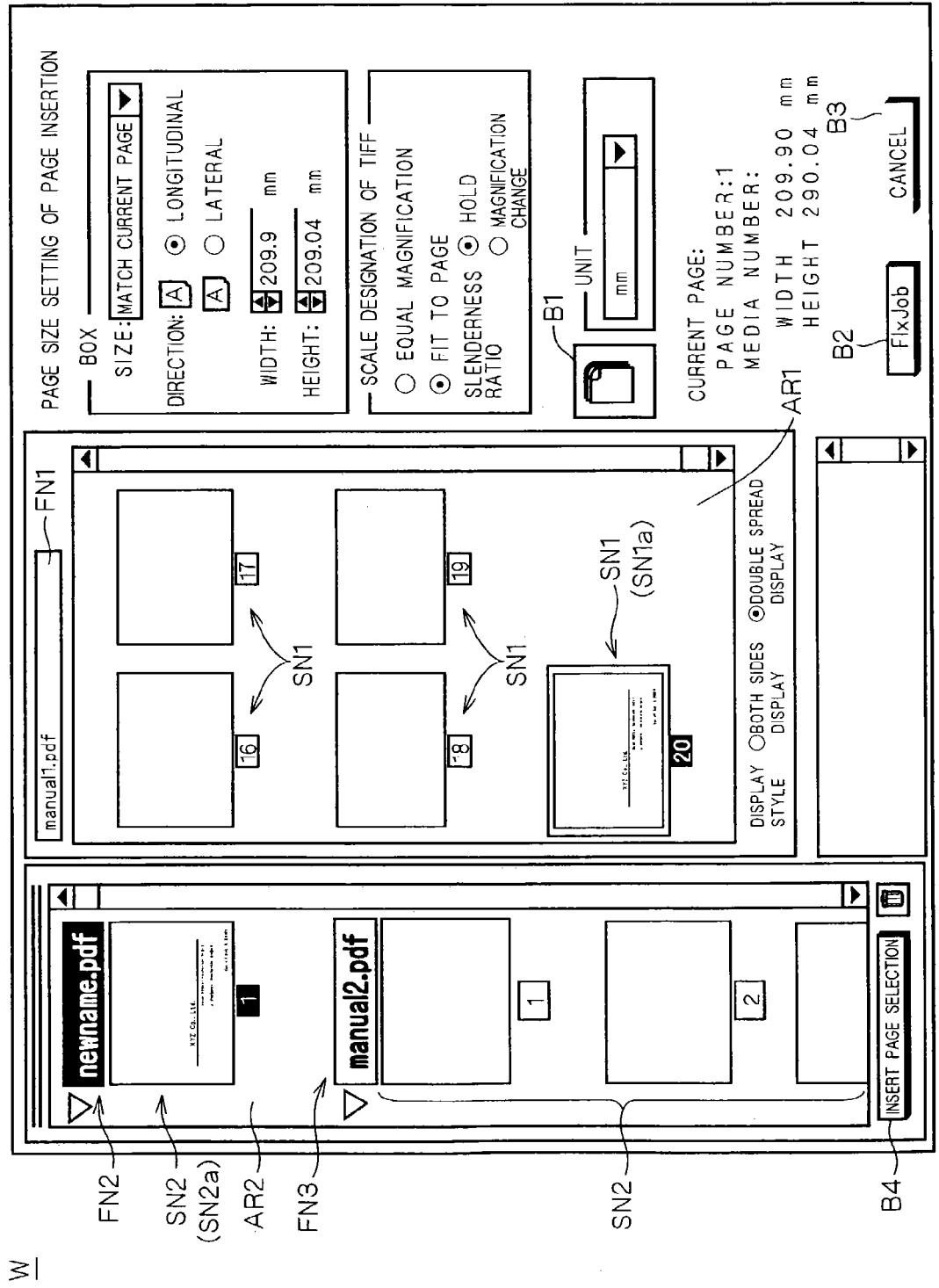
FIG. 6 is a diagram showing an execute window of page replacement processing displayed on a display part.

Page arrangement processing proceeds in accordance with an instruction from an operator operating the operation part 23 in a predetermined procedure. FIG. 6 shows illustratively execute window W of page arrangement processing that is displayed on the display part 24.

When executing page arrangement processing, a job data that is stored in the storage part 22 or temporarily stored in the RAM 21c is selected as a processing object. Alternatively, by selecting a job ticket to be described hereinafter, a job data that is already subjected to RIP and then preserved in the printing apparatus 3 can also be a processing object. The page arrangement information of the selected job data is preserved in the RAM 21c as a temporary data for edition. Then, the thumbnail processing part 57 creates thumbnail image SN1 corresponding to respective pages of this job data, so that based on the page arrangement information, thumbnail image SN1 and the page number are displayed in page order in a predetermined display area AR1 on execution window W displayed on the display part 24. Likewise, the thumbnail processing part 57 creates thumbnail image SN2 with respect to the page data that has been picked up and preserved in the candidate page information processing part 56 as a candidate page used for page replacement processing and page insertion processing, so that they are displayed in a predetermined display area AR2 on execution window W.

When executing page replacement processing, the thumbnail image that is displayed on display area AR1 as an object to be replaced, and the thumbnail image of a replacement candidate page that is displayed on display area AR2 are clicked with the mouse 23a, followed by a double-click. At this time, the page replacement processing part 51 rewrites the content of the temporary data for edition to the content obtained by the page replacement processing. Page arrangement indicated by thumbnail image SN1 on display area AR1 is also immediately updated to the resulting state in accordance with the content of the temporary data for edition so rewritten. This rewriting and update are also performed similarly in other processing in the page arrangement processing so as to correspond to the content in each processing part. Therefore, the related description will be omitted in the following.

When executing page insertion processing, thumbnail image SN2 of an arbitrary page data as a candidate of an insertion is dragged with the mouse 23a and dropped at a desired insertion position within display area AR1 (on the bottom or right side of thumbnail image SN1 corresponding to the directly before page of the desired insertion position).

When executing page deletion processing, thumbnail image SN1 of a page to be deleted on display area AR1 is double-clicked with the mouse 23a. When executing page interchange processing, thumbnail image SN1 of one page that is desired to be interchanged is clicked with the mouse 23a, followed by a double-click of the other page.

When executing blank page insertion processing, the desired blank page insertion position in thumbnail image SN1 corresponding to the directly before page is clicked with the mouse 23a, followed by a click of blank page insertion button B1 provided on execution window W.

After executing the desired various page arrangement processing to the job data, as described above, the operator clicks on "FixJob" button B2 on execution window W, thereby determining the page arrangement processings executed until then. If a processing object is a job data not subjected to RIP, the temporary data for edition at that point becomes a fresh page arrangement information, and the job data is rewritten depending on the type of processing and then stored in the storage part 22 or RAM 21c. In the page replacement processing, information corresponding to the content of a page to be replaced in a job data is replaced with information related to a page data used for replacement. In the page replacement processing, layout information related to the corresponding page and association information are added to a job data. In the page deletion processing, layout information related to the corresponding page and association information are deleted. Further, in accordance with a predetermined instruction that the operator designates through the operation part 23, the job data is stored, for example, as data of PDF in the storage part 22 or RAM 21c, alternatively, further transferred to the printing apparatus 3.

On the other hand, the replacement processing of a job data after being subjected to RIP is not the processing of the job data itself. Therefore, instead of the rewriting of the job data, an additional description of a job ticket is performed in a job ticket update part 62 by clicking on "FixJob" button B2, which will be described hereinafter.

It is noted that all the page arrangement processings until then are invalid by clicking on a cancel button B3.

The job ticket processing part 6 is provided to perform a predetermined processing related to a job ticket (to be described hereinafter) which is sent from the printing apparatus 3 when a job data requires page replacement processing, and which describes setting information for printing the job data. The job ticket processing part 6 has a job ticket selecting part 61 and job ticket update part 62.

The job ticket selecting part 61 selects a job ticket to be processed from one or more job tickets sent from the printing apparatus 3, and directs the execution of the processing. When any job ticket is selected on a selection screen (not shown), a thumbnail image of the job data corresponding to this job ticket is sent from the printing apparatus 3 via the network N. This thumbnail image will be used for the page arrangement processing in the page arrangement processing part 5, as described above.

The job ticket update part 62 adds to a job ticket, when page replacement processing is determined, the job data after the page replacement processing or the content of a job. This will be fully described hereinafter.

Figure 3:
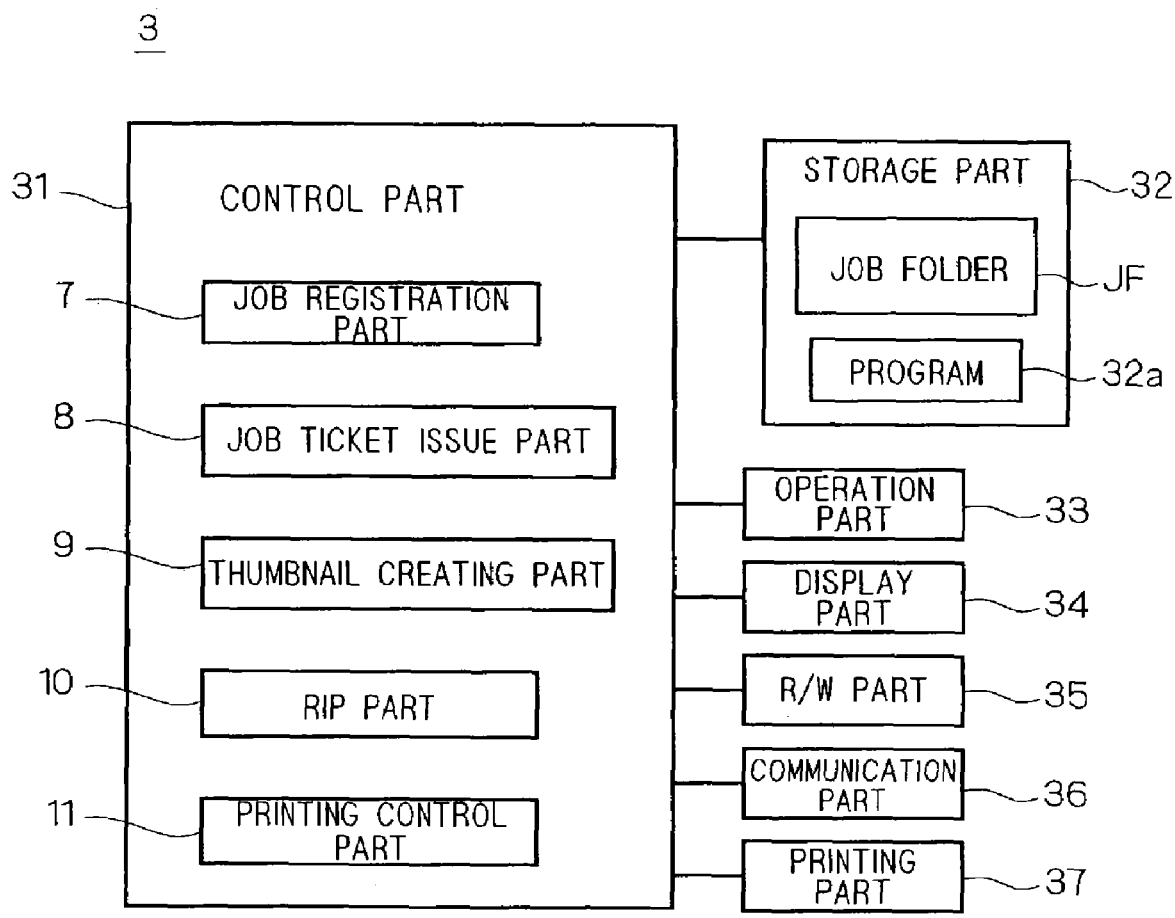
FIG. 3 is a diagram to explain the functions implemented by a control part of a printing system.

FIG. 3 is a diagram to explain functions to be implemented in the control part 31 of the printing apparatus 3. In the control part 31, a predetermined program stored in the storage part 32 is executed so that the CPU 31*a*, ROM 31*b* and RAM 31*c* function to implement a job registration part 7, job ticket issue part 8, thumbnail creating part 9, RIP part 10, and printing control part 11.

The job registration part 7 performs processing of preserving a job data in the storage part 32, the job data being created in the printing data creating apparatus 2 and then provided by reading via the network N or from a storage medium (not shown). In this processing, the job registration part 7 functions to create job folders JF corresponding to respective job data in the storage part 32 and to store these job data therein. Job data after being subjected to RIP (rasterize-processed job data, hereinafter referred to as "RIP-processed job data") are also stored in their respective job folders JF. In addition, the job ticket that has been sent from the printing data creating apparatus 2 when executing page replacement processing of the RIP-processed data, and page data for replacement are also stored in job folders JF.

The job ticket issue part 8 issues, when executing page replacement processing of the RIP-processed data, a job ticket that describes the job data determined before the replacement processing and the content of a job. FIGS. 4A and 4B show illustratively job tickets. FIG. 4A shows job ticket JT1 before the replacement processing.

Job ticket JT1 shown in FIG. 4A contains seven records R1 through R7 and is provided as a text file. Individual record, item name (index) and setting content are separated by tab, and respective records of the job ticket JT1 are separated by line feed code. The RIP part 10 and printing control part 11. search the indexes and subsequent setting contents, and execute processing based on the setting contents of their respective records. Therefore, the order of arrangement of the records may be changed. In an alternative, the description format of the job ticket may not be limited to the example shown in FIG. 4A. If only a predetermined rule is decided, for example, CSV (comma separated value) format may be used.

In job ticket JT1 of FIG. 4A, records R1 through R4 are records indicating the contents of job data. That is, record R1 indicates that the object job name of the job ticket is "JOB1"; record R2 indicates that the job data executed in "JOB1" is data of 20 pages; record R3 indicates that the sheet direction set in "JOB1" is portrait orientation; and record R4 indicates that the size of a sheet as a printing object is "A4". On the other hand, records R5 through R7 are records indicating the settings used in the above job. That is, record R5 indicates that printing is executed immediately after receiving job ticket JT1; record R6 indicates that the number of printed matter to be printed is ten; and record R7 indicates that the feeding tray used in printing is a second tray (i.e., the second feeding part 37*a*).

The thumbnail creating part 9 creates, when executing replacement processing of RIP-processed job data, a thumbnail image of this job data in response to the demand from the printing data creating apparatus 2, as described above. Preferably, the thumbnail image is created by algorithm for ease in understanding the page content even if it is of reduced scale, instead of a mere pixel averaging and skipping.

The RIP part 10 performs RIP for making job data into raster data processable in the printing apparatus 3. In accordance with an instruction designated by the operator through the operation part 33, for example, job data of PDF style stored in job folder JF is transformed to data of raster (bit map) format. As will be described hereinafter, when part of job data is replaced, only the job data for replacement sent from the printing data creating apparatus 2 is subjected to RIP. Note that any known technique is applicable to RIP.

The printing control part 11 is provided to control the execution of printing in the printing part 37. With the operator of the printing apparatus 3 operating the operation part 33, a printing menu is displayed on the display part 34 under the control of the printing control part 11. When a job to be executed is selected and a predetermined printing setting is determined by the operator's operation, the printing control part 11 reads out RIP-processed raster data stored in job folder JF corresponding to this job, and then controls respective parts of the printing part 37 so as to execute printing. When printing job data after being subjected to replacement processing, printing is executed in accordance with a job ticket that has been updated in the printing data creating apparatus 2 and then stored in job folder JF. That is, all the pages except for the page(s) to be replaced are printed on the basis of the job data before replacement, whereas the page(s) so replaced is/are printed on the basis of the RIP-processed page data that is preserved separately in job folder JF.

Flow of Replacement Processing

Following is replacement processing of job data in the present invention. FIG. 5 is a diagram showing the flow of replacement processing, dividing into the processing in the printing data creating apparatus 2 and that in the printing apparatus 3.

This replacement processing is executed if there is need for replacing one or more contents of a job data in newly printing based on the job data, which is already subjected to RIP in the printing apparatus 3 and then preserved in a predetermined job folder JF.

If it is judged that a job data to be printed again requires some replacement, under the condition that a new page data for replacement is previously prepared and stored in the storage part 22, a request for a job ticket for replacement is provided from the printing data creating apparatus 2 to the printing apparatus 3 (step S1*a*). In another alterative, a replacement instruction may directly be provided to the printing apparatus 3 (step S1*b*).

On the receipt of the replacement instruction, the printing apparatus 3 creates, in the job ticket issue part 8, job ticket JT1 (FIG. 4A) related to a job data subjected to replacement (step S2). The created job ticket JT1 is sent through the communication part 36 to the printing data creating apparatus 2 via the network N.

The printing data creating apparatus 2 preserves temporarily at the storage part 22 job ticket JT1 received by the communication part 26. The replacement processing, more specifically the page replacement processing in the printing data creating apparatus 2 is started when the job ticket selecting part 61 selects job ticket JT1 and reads its content (step S3).

After the content of job ticket JT1 is read in, the job ticket processing part 6 analyzes the descriptions of respective records of job ticket JT1. In the case of job ticket JT1 shown in FIG. 4A, the descriptions of the seven records R1 through R7 are analyzed to obtain information necessary for the page arrangement processing. First, the job name "JOB1" described in record R1 is captured. In response to this, the thumbnail processing part 57 immediately requests the printing apparatus 3 to send a thumbnail image of job data corresponding to job name "JOB1" (step S4). Note that the job name does not necessarily agree with the file name of job data. On the accept of the request of thumbnail image, the printing apparatus 3 creates a thumbnail image from the job data and then sends it to the printing data creating apparatus 2 (step S5). On the receipt of this thumbnail image, the printing data creating apparatus 2 functions to display it on the display part 24, so that the page replacement processing is executable (step S6).

FIG. 6 is a diagram showing execution window W of the page replacement processing which is displayed on the display part 24 of the printing data creating apparatus 2. FIGS. 7A and 7B are diagrams showing in enlarged view the printing contents before and after the replacement of a page that is shown as the object to be replaced in FIG. 6.

Referring now to FIG. 6, as a result that the thumbnail processing part 57 requests the printing apparatus 3 to send a thumbnail image corresponding to job name referred to as "JOB1", thumbnail images SN1 of page 16 to page 20 of the job data is displayed in display area AR1, the file name of the job data, "manual 1.pdf", is described in file name column FN1. Thumbnail images SN2 of page data which are page replacement candidates (page insertion candidates), are displayed in display area AR2 on the left side of display area AR1. The file names of the page data "newname.pdf" and "manual2.pdf" are described in file name columns FN2 and FN3, respectively. The page data in display area AR2 can be added by clicking on "Insertion page selection" button B4 with the mouse 23a, followed by a predetermined operation.

It is assumed that page 20 of job data referred to as "manual1.pdf" is replaced with a new page. FIG. 6 illustrates the state that thumbnail image SN1a corresponding to page 20 is selected and the page number is displayed in inverse video. FIG. 7A shows this page in enlarged dimension, as page P1. It is also assumed that page data referred to as "newname.pdf" is a replacement candidate file. FIG. 6 illustrates the state that thumbnail image SN2a of "newname.pdf" is selected and its page number and file name are displayed in inverse video. FIG. 7B shows this page displayed in enlarged dimension, as page P2.

When the operator selects the pages before and after replacement with the mouse 23a referring to FIG. 6, followed by a double click, thumbnail image SN1a of page 20 in the job data "manual1.pdf" is replaced with the page data (page 1) in "newname.pdf".

However, the above-mentioned processing is to virtually change page arrangement by temporarily storing in the RAM 21c the content of the job data to be obtained by this processing as a temporary data for edition, and not to change the content of the job data itself. After the termination of the desired replacement processing and the confirmation of having no trouble about the result of the processing, the operator clicks on "FixJob" button B2 with the mouse 23a, so that the content of the replacement processing is determinated (step S7).

When "FixJob" button B2 is clicked, the job ticket update part 62 creates job ticket JT2 describing the content of the job after the replacement processing, on the basis of job ticket JT1 before replacement processing and the temporary data for edition. FIG. 4B shows job ticket JT2 describing the above replacement processing on the basis of job ticket JT1 shown in FIG. 4A. Job ticket JT2 shown in FIG. 4B consists of eleven records R11 through R21. Records R11 through R17 have the same description as job ticket JT1, and four records R18 through R21 correspond to the contents added in the job ticket update part 62. That is, these four records provide the printing apparatus 3 with the following information that page 20 should be replaced with the page data referred to as "newname.pdf", that the application used for replacement is "differential edition plug-in" (the name of the program 22b implementing the replacement processing), and that the latest editorial date is 8:40 a.m. on Aug. 12, 2002. By describing "the latest editorial date" as record R21, if a plurality of job tickets are issued, the latest job ticket can be referred to for printing.

In the case that the data format of the page data for replacement is different from the data format of the original job data, for example, when the original job data is of PDF and the page data for replacement is of EPS (encapsulated postscript) format, the page data for replacement is transformed to the same data format as the original job data, by clicking on "FixJob" button B2 and, alternatively, with subsequent predetermined operation.

On the completion of the update of the job ticket, job ticket JT2 and the page data for replacement "newname.pdf" are transferred to the printing apparatus 3 (step S8). On the receipt of these data, the printing apparatus 3 functions to store these data together in job folder JF preserving the corresponding job data. By doing so, in the next printing, the job is to be executed by referring to the stored job ticket JT2, in other words, the job is re-registered (step S9).

Page data "newname.pdf" freshly preserved in job folder JF is then subjected to RIP (step S10). This enables the execution of a job subsequent to the replacement, i.e., printing processing (step S11). When the operator provides an instruction of the execution of printing, the printing apparatus 3 executes a job referred to as "JOB1" on the basis of job ticket JT2. Specifically, the printing apparatus 3 prints page 1 through page 19 in job data referred to as "manual1.pdf" on the basis of the rasterize-processed job data stored in the storage part 32, and page 20 on the basis of the job data obtained by subjecting "newname.pdf" to REP in step S10, thereby obtaining 10 copies of a printed matter consisting of 20 pages that are of A4 size and portrait orientation.

Thus, in the present invention, if it is desired to execute printing after replacing part of the RIP-processed job data, firstly, the printing apparatus 3 issues a job ticket, as described above. The printing data creating apparatus 2 adds the information of page data for replacement to the content of the job ticket and sends it to the printing apparatus 3 together with the page data for replacement. The printing apparatus 3 performs RIP of only the received page data for replacement and then performs printing after replacement processing in accordance with the job ticket. This eliminates the necessity for performing again RIP of printing data irrelevant to the replacement, thereby realizing an increase in the efficiency of printing processing including replacement, as well as cost saving. In addition, since the processing including page replacement processing is executed by using thumbnail image, the page replacement processing can be executed without giving and receiving job data itself between the printing data creating apparatus and printing apparatus. Therefore, by transferring image data etc. having a large data capacity via the network, page replacement processing can be performed without throwing any load on traffic.

Modifications

When performing page replacement processing of RIP-processed job data, other page arrangement processing such as page insertion, page interchange, page deletion or blank page insertion processing may also be executed at that time. By describing the content of such processing in a job ticket on the basis of a predetermined description rule, the printing apparatus 3 executes printing by referring to the job ticket so described. In the case of blank page insertion, a page having no entity description is to be inserted as blank data. Further, the printing setting described in a job ticket may be changed along with page replacement processing.

In the printing system 1 of the foregoing preferred embodiment, the printing data creating apparatus 2 and printing apparatus 3 are provided as separate apparatuses and are connected via the network. In another alternative, the printing apparatus may be provided with the function of the printing data creating apparatus.

While the invention has been shown and described in detail, the foregoing description is in all aspects illustrative and not restrictive. It is therefore understood that numerous modifications and variations can be devised without departing from the scope of the invention.

What is claimed is:

1. A printing system comprising:
    (a) a printing apparatus for printing a printed matter on the basis of rasterize-processed printing data, said printing apparatus comprising:
        (a-1) a raster image processing element for performing raster image processing of printing data;
        (a-2) a storage element for storing said rasterize-processed printing data; and
        (a-3) a job ticket issue element for issuing a first job ticket in which setting information for printing a first printed matter is described on the basis of first printing data stored in said storage element;
    (b) a printing data creating apparatus for creating printing data, comprising:
        (b-1) a layout creating element for creating the layout of a printed matter page by page;
        (b-2) a page arrangement processing element for performing page arrangement processing of a plurality of layout pages, said page arrangement processing element being capable of performing page rearrangement processing on the basis of said first printing data being rasterize-processed, by referring to the description of said first job ticket;
        (b-3) a job ticket obtaining element for obtaining said first job ticket; and
        (b-4) a job ticket update element for creating a second job ticket describing setting information for printing a second printed matter, by rewriting the content of said first job ticket on the basis of the result of said page rearrangement processing, wherein
    said printing apparatus executes printing of said second printing matter by referring to said second job ticket.

2. The printing system according to claim 1 wherein the result of reference to said second job ticket indicating that a new page not contained in said first printed matter is contained in said second printed matter, said printing apparatus performs said raster image processing of page data corresponding to said new page.

3. The printing system according to claim 2 wherein said printing data creating apparatus and said printing apparatus are connected to each other via a network, data being given and received between said printing data creating apparatus and said printing apparatus via said network.

4. The printing system according to claim 3 wherein said printing apparatus further comprises:
    (a-4) a thumbnail creating element for creating a thumbnail image page by page on the basis of said rasterize-processed printing data, and wherein
    said printing data creating apparatus obtains said thumbnail image via said network, said page arrangement processing and said page rearrangement processing in said page arrangement processing element being performed by using said thumbnail image.

5. The printing system according to claim 1 wherein said page arrangement processing element comprises:
    (b-2-1) a page replacement processing element for performing replacement processing of replacing page data of at least one page of said first printed matter with page data for replacement, as said page arrangement processing and said page rearrangement processing, and wherein
    said job ticket update element creates said second job ticket by adding information related to said replacement processing to said first job ticket, on the basis of the result of said replacement processing, and
    said printing apparatus obtains said second job ticket and said page data for replacement and prints said second printed matter on the basis of said printing data and said page data for replacement, in accordance with the description of said second job ticket.

6. The printing system according to claim 5 wherein said printing apparatus performs raster image processing of only said page data for replacement when printing said second printed matter.

* * * * *